(12) United States Patent
Gerber et al.

(10) Patent No.: US 10,261,569 B2
(45) Date of Patent: Apr. 16, 2019

(54) UNIVERSAL SERIAL BUS (USB) HOST AND CLIENT DEVICES FOR SUPPORTING SCHEDULED LOW-POWER OPERATIONS

(71) Applicant: QUALCOMM Incorporated, San Diego, CA (US)

(72) Inventors: Nir Gerber, Haifa (IL); Lior Amarilio, Yokneam (IL); Amit Gil, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/702,175

(22) Filed: May 1, 2015

(65) Prior Publication Data

US 2016/0320823 A1 Nov. 3, 2016

(51) Int. Cl.
*G06F 1/32* (2019.01)
*G06F 1/26* (2006.01)
(Continued)

(52) U.S. Cl.
CPC .......... *G06F 1/3253* (2013.01); *G06F 13/385* (2013.01); *G06F 2213/0042* (2013.01); *Y02D 10/151* (2018.01); *Y02D 50/20* (2018.01)

(58) Field of Classification Search
CPC ........ G06F 1/266; G06F 1/3206; G06F 1/324; G06F 1/32; G06F 13/385; G06F 1/3253;
(Continued)

(56) References Cited

U.S. PATENT DOCUMENTS 6,009,527 A * 12/1999 Traw .................. G06F 21/71
710/8
6,765,931 B1 * 7/2004 Rabenko .................. H04B 3/23
348/E7.049
(Continued)

OTHER PUBLICATIONS

International Search Report and Written Opinion for PCT/US2016/025477, dated Jun. 23, 2016, 10 pages.
(Continued)

*Primary Examiner* — Chun Cao
(74) *Attorney, Agent, or Firm* — Withrow & Terranova, PLLC (57) ABSTRACT

Aspects disclosed in the detailed description include scheduled universal serial bus (USB) low-power operations. In this regard, in one aspect, a USB host controller determines a low-power operation schedule for a USB client device. The low-power operation schedule comprises one or more scheduled low-power operation periods, each corresponding to a respective entry time and a respective exit time. The USB host controller communicates the low-power operation schedule to the USB client device using one or more USB standard packets. By scheduling the one or more scheduled low-power operation periods with respective entry and exit times, the USB host controller or the USB client controller is able to start and end the one or more scheduled low-power operation periods without incurring additional signaling, thus improving efficiency of the USB low-power operation. Further, by communicating the low-power operation schedule using USB standard packets, it is possible to preserve compatibility with USB standards.

22 Claims, 8 Drawing Sheets

(51) Int. Cl.
*G06F 1/3234* (2019.01)
*G06F 13/38* (2006.01)

(58) Field of Classification Search
CPC .......... G06F 2213/0042; Y02D 10/151; Y02D 50/20
See application file for complete search history.

(56) References Cited

U.S. PATENT DOCUMENTS

| | | | |
|---|---|---|---|
| 6,816,976 B2 | 11/2004 | Wright et al. | |
| 7,490,255 B2 * | 2/2009 | Diefenbaugh | G06F 13/385 710/100 |
| 7,844,760 B2 * | 11/2010 | Jeyaseelan | G06F 13/128 370/412 |
| 8,166,221 B2 | 4/2012 | Lee et al. | |
| 8,255,708 B1 | 8/2012 | Zhang | |
| 8,452,995 B1 | 5/2013 | Lachwani et al. | |
| 8,661,268 B2 | 2/2014 | Brooks et al. | |
| 8,775,838 B2 * | 7/2014 | Lee | G06F 1/32 713/320 |
| 8,839,016 B2 | 9/2014 | Zhang et al. | |
| 8,904,062 B2 * | 12/2014 | Moore | H04L 47/36 710/313 |
| 9,143,332 B2 * | 9/2015 | Nass | H04L 12/12 |
| 9,176,570 B2 * | 11/2015 | Jeyaseelan | G06F 1/3253 |
| 2005/0144334 A1 * | 6/2005 | Hamdi | G06F 13/385 710/15 |
| 2007/0005859 A1 | 1/2007 | Diefenbaugh et al. | |
| 2008/0165902 A1 * | 7/2008 | Moriwaki | H04L 7/042 375/340 |
| 2009/0327774 A1 | 12/2009 | Jeyaseelan et al. | |
| 2010/0082872 A1 * | 4/2010 | Fleming | G06F 13/385 710/310 |
| 2012/0072636 A1 | 3/2012 | Derr et al. | |
| 2013/0063607 A1 * | 3/2013 | Shimotono | H04N 5/232 348/187 |
| 2013/0268789 A1 | 10/2013 | Yang | |
| 2013/0290758 A1 | 10/2013 | Quick et al. | |
| 2014/0013018 A1 * | 1/2014 | Sella | G06F 13/4295 710/106 |
| 2016/0170472 A1 * | 6/2016 | Cosaro | G06F 1/3287 710/104 |

OTHER PUBLICATIONS

International Preliminary Report on Patentability for PCT/US2016/025477, dated Apr. 7, 2017, 20 pages.

* cited by examiner

UNIVERSAL SERIAL BUS (USB) HOST AND CLIENT DEVICES FOR SUPPORTING SCHEDULED LOW-POWER OPERATIONS

BACKGROUND

I. Field of the Disclosure

The technology of the disclosure relates generally to a universal serial bus (USB).

II. Background

Mobile communication devices have become increasingly common in current society. The prevalence of these mobile communication devices is driven in part by the many functions that are now enabled on such devices. Increased processing capabilities in such devices means that mobile communication devices have evolved from being purely communication tools into sophisticated mobile entertainment centers, thus enabling enhanced user experiences.

Peripheral devices, such as audio headsets and portable audio speakers, are often attached to the mobile communication devices for convenience and/or improved audio-playing experience. A universal serial bus (USB) interface is an increasingly popular standard interface to connect such peripherals both outside and inside the mobile communication devices. When a peripheral device is connected to a mobile communication device via the USB interface, the peripheral device is a USB client and the mobile communication device acts as a USB host. As a result, the peripheral device draws power from the mobile communication device, thus shortening the battery life of the mobile communication device.

Since mobile communication devices are facing increasing challenges to provide more and more processing capabilities with limited power supply, it is critical to minimize power consumptions by the peripheral devices connecting to the mobile communication devices as the USB clients.

SUMMARY OF THE DISCLOSURE

Aspects disclosed in the detailed description include scheduled universal serial bus (USB) low-power operations. In this regard, in one aspect, a USB host controller determines a low-power operation schedule for a coupled USB client device. The low-power operation schedule comprises one or more scheduled low-power operation periods, each corresponding to a respective entry time and a respective exit time. The USB host controller communicates the low-power operation schedule to the coupled USB client device using one or more existing USB standard packets. In another aspect, a USB client controller is also able to determine the low-power operation schedule and communicate the low-power operation schedule to a coupled USB host device using one or more existing USB standard packets. By scheduling the one or more scheduled low-power operation periods with respective entry and exit times, the USB host controller or the USB client controller is able to start and end the one or more scheduled low-power operation periods without incurring additional signaling, thus improving efficiency of the USB low-power operation. Further, by communicating the low-power operation schedule using the one or more existing USB standard packets, it is possible to preserve compatibility with the USB standards.

In this regard, in one aspect, a USB host device for supporting scheduled low-power operations is provided. The USB host device comprises a host USB physical interface configured to be coupled to a USB client device. The USB host device also comprises a USB host controller. The USB host controller is configured to determine a low-power operation schedule for the coupled USB client device, wherein the low-power operation schedule comprises one or more scheduled low-power operation periods, each starting at a respective entry time and ending at a respective exit time. The USB host controller is also configured to communicate the low-power operation schedule to the coupled USB client device using one or more existing USB standard packets. The USB host controller is also configured to start a scheduled low-power operation period among the one or more scheduled low-power operation periods according to the respective entry time. The USB host controller is also configured to end the scheduled low-power operation period according to the respective exit time.

In another aspect, a method for supporting scheduled USB low-power operations at a USB host device is provided. The method comprises determining a low-power operation schedule for a coupled USB client device, wherein the low-power operation schedule comprises one or more scheduled low-power operation periods, each starting at a respective entry time and ending at a respective exit time. The method also comprises communicating the low-power operation schedule to the coupled USB client device using one or more existing USB standard packets. The method also comprises starting a scheduled low-power operation period among the one or more scheduled low-power operation periods according to the respective entry time. The method also comprises ending the scheduled low-power operation period according to the respective exit time.

In another aspect, a USB client device for supporting scheduled low-power operations is provided. The USB client device comprises a client USB physical interface configured to be coupled to a USB host device. The USB client device also comprises a USB client controller. The USB client controller is configured to determine a low-power operation schedule, wherein the low-power operation schedule comprises one or more scheduled low-power operation periods, each starting at a respective entry time and ending at a respective exit time. The USB client controller is also configured to communicate the low-power operation schedule to the coupled USB host device using one or more existing USB standard packets. The USB client controller is also configured to receive a confirmation from the coupled USB host device for the low-power operation schedule. The USB client controller is also configured to start a scheduled low-power operation period among the one or more scheduled low-power operation periods according to the respective entry time. The USB client controller is also configured to end the scheduled low-power operation period according to the respective exit time.

In another aspect, a method for supporting scheduled USB low-power operations at a USB client device is provided. The method comprises determining a low-power operation schedule, wherein the low-power operation schedule comprises one or more scheduled low-power operation periods, each starting at a respective entry time and ending at a respective exit time. The method also comprises communicating the low-power operation schedule to a coupled USB host device using one or more existing USB standard packets. The method also comprises receiving a confirmation from the coupled USB host device for the low-power operation schedule. The method also comprises starting a scheduled low-power operation period among the one or more scheduled low-power operation periods according to the respective entry time. The method also comprises ending the scheduled low-power operation period according to the respective exit time.

In another aspect, a USB host device for supporting scheduled low-power operations is provided. The USB host device comprises a host USB physical interface configured to be coupled to a USB client device. The USB host device also comprises a USB host controller. The USB host controller is configured to determine a low-power operation schedule for the coupled USB client device, wherein the low-power operation schedule comprises one or more scheduled low-power operation periods, each starting at a respective entry time and ending at a respective exit time. The USB host controller is also configured to communicate the low-power operation schedule to the coupled USB client device using one or more USB proprietary packets. The USB host controller is also configured to start a scheduled low-power operation period among the one or more scheduled low-power operation periods according to the respective entry time. The USB host controller is also configured to end the scheduled low-power operation period according to the respective exit time.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include scheduled universal serial bus (USB) low-power operations. In this regard, in one aspect, a USB host controller determines a low-power operation schedule for a coupled USB client device. The low-power operation schedule comprises one or more scheduled low-power operation periods, each corresponding to a respective entry time and a respective exit time. The USB host controller communicates the low-power operation schedule to the coupled USB client device using one or more existing USB standard packets. In another aspect, a USB client controller is also able to determine the low-power operation schedule and communicate the low-power operation schedule to a coupled USB host device using one or more existing USB standard packets. By scheduling the one or more scheduled low-power operation periods with respective entry and exit times, the USB host controller or the USB client controller is able to start and end the one or more scheduled low-power operation periods without incurring additional signaling, thus improving efficiency of the USB low-power operation. Further, by communicating the low-power operation schedule using the one or more existing USB standard packets, it is possible to preserve compatibility with the USB standards.

Figure 1:
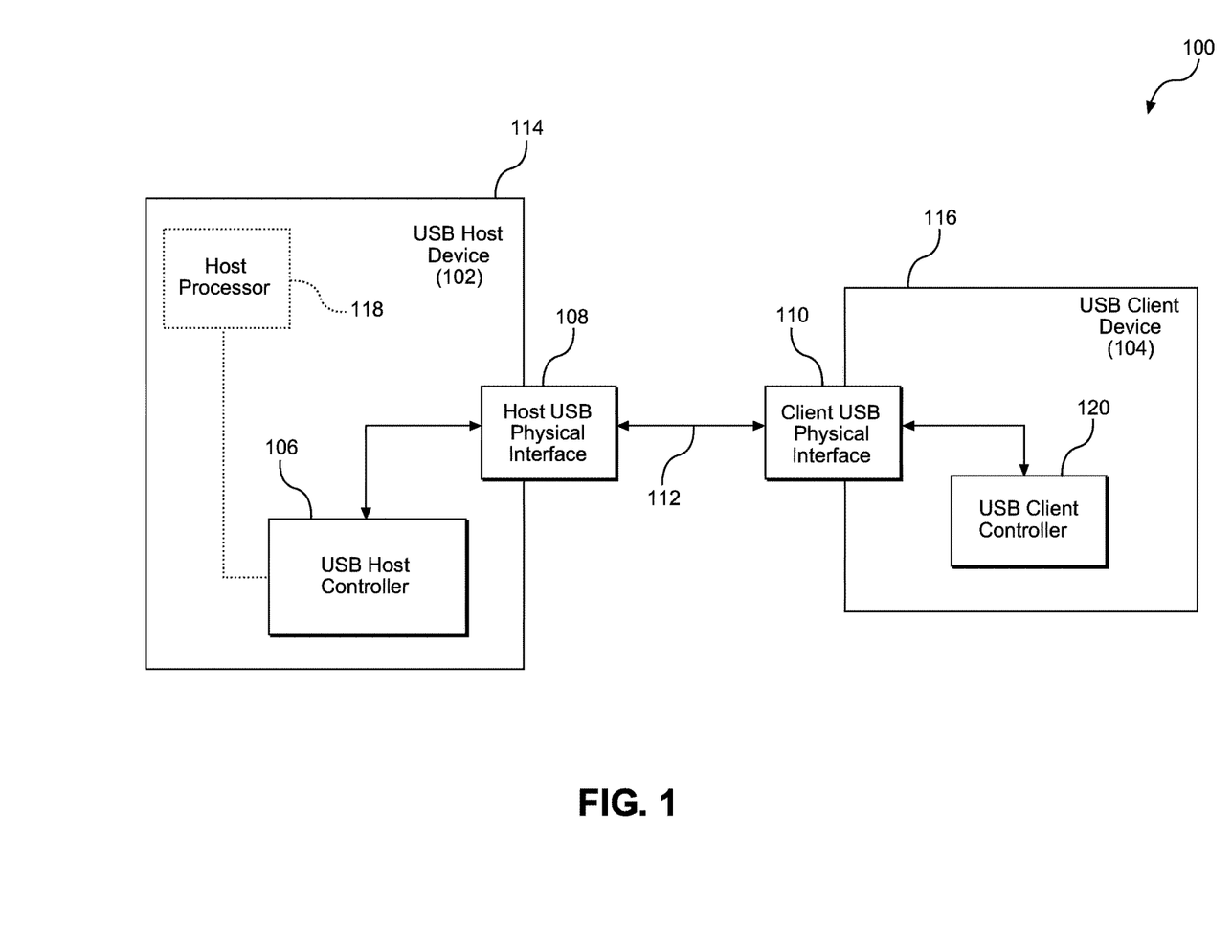
FIG. 1 is a schematic diagram of an exemplary universal serial bus (USB) system architecture for communications between a USB host device and a USB client device.
Figure 2:
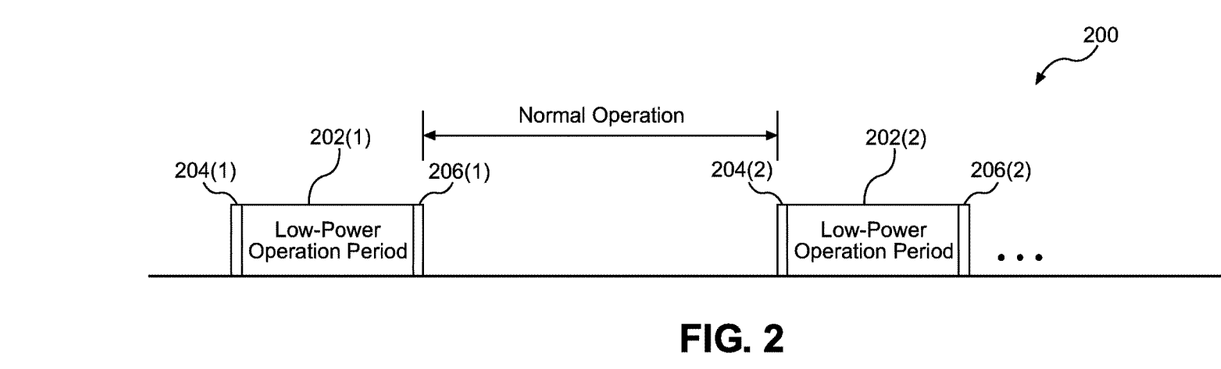
FIG. 2 is a schematic diagram of an exemplary standard USB low-power operation scheme according to aspects defined in USB 2.0 Link Power Management (LPM) Addendum.

Before discussing aspects of scheduled USB low-power operations that include specific aspects of the present disclosure, a brief overview of a conventional USB low-power operation as defined in USB 2.0 Link Power Management (LPM) Addendum is provided in FIG. 2 with reference to an exemplary USB system architecture provided in FIG. 1. The discussion of specific exemplary aspects of the scheduled USB low-power operation starts below with reference to FIG. 3.

In this regard, FIG. 1 is a schematic diagram of an exemplary USB system architecture 100 for communications between a USB host device 102 and a USB client device 104. The USB host device 102 comprises a USB host controller 106 and a host USB physical interface 108. The host USB physical interface 108 is coupled to a client USB physical interface 110 by a USB communication medium 112. In a non-limiting example, the host USB physical interface 108 and the client USB physical interface 110 may be provided based on the USB 2.0 and/or the USB 3.0 standards. In this regard, the USB communication medium 112 may be a USB 2.0 compliant or a USB 3.0 compliant cable. In another non-limiting example, the USB host device 102 may be a first integrated circuit (IC) chip 114 and the USB client device 104 may be a second IC chip 116. In this regard, the host USB physical interface 108 and the client USB physical interface 110 are configured to provide chip-to-chip communication over the USB communication medium 112.

With reference to FIG. 1, the USB host controller 106 may be communicatively coupled to a host processor 118 to receive application-specific instructions for communications with the USB client device 104. In a non-limiting example, the USB host controller 106 is configured to transmit and receive USB standard packets in compliance with the USB 2.0 and/or USB 3.0 standards. The USB client device 104 comprises a USB client controller 120, which is also configured to transmit and receive the USB standard packets in compliance with the USB 2.0 and/or USB 3.0 standards.

With continuing reference to FIG. 1, the USB 2.0 standard defines mechanisms for power management between the USB host device 102 and the USB client device 104. The USB 2.0 power management mechanism is based on a simple protocol for detecting a "suspend" mode operation for low-power operation and special signaling protocol for allowing either the USB host device 102 or the USB client device 104 to initiate a "resume" mode operation to return to normal operation. The USB 2.0 power management mechanism, although simple, is considered a large-grain mechanism not intended to be used for micromanaging or optimizing low-power operations between the USB host device 102 and the USB client device 104. For example, to "suspend" the USB client device 104, the USB host device 102 must suspend activities on the host USB physical interface 108 for at least three milliseconds (3 ms). Furthermore, the USB client device 104 is prohibited from initiating the "resume" mode operation until at least two milliseconds (2 ms) after the USB client device 104 is suspended. In this regard, it takes a minimum of five milliseconds (5 ms) for entering and exiting the "suspend" mode operation. As opposed to the USB 2.0 power management mechanism, the USB 2.0 LPM Addendum provides an improved USB power management mechanism to reduce transitional latency associated with the USB 2.0 "suspend" and "resume" mode operations.

In this regard, FIG. 2 is a schematic diagram of an exemplary standard USB low-power operation scheme 200 according to aspects defined in the USB 2.0 LPM Addendum (hereinafter referred to as "USB LPM"). Elements of FIG. 1 are referenced in connection with FIG. 2 and will not be re-described herein.

With reference to FIG. 2, in addition to preserving the "suspend" and "resume" mode operations in the USB 2.0 standard, the USB LPM introduces a new "sleep" mode operation for the USB host device 102 and the USB client device 104. The "sleep" mode operation is similar to the "suspend" and "resume" mode operations in the USB 2.0 standard, but supports finer granularity and incurs a reduced transitional latency comparing to the "suspend" and "resume" mode operations.

With continuing reference to FIG. 2, to start a low-power operation period 202(1), the USB host device 102 (not shown) transmits an LPM transaction packet 204(1) to the USB client device 104 (not shown). The low-power operation period 202(1) starts if a USB acknowledgement (ACK) packet (not shown) is received from the USB client device 104. To exit the low-power operation period 202(1), the USB host device 102 must provide an exit signal 206(1) to the USB client device 104. According to the USB LPM, the exit signal 206(1) may be provided via remote wake, resume signaling, reset signaling, or disconnect. The same procedure is repeated to initiate a next low-power operation period 202(2), and so on. Since it takes much less time to transmit the LPM transaction packet 204(1) and the exit signal 206(1), the "sleep" mode operation is able to reduce the multi-millisecond transitional latencies associated with the "suspend" and "resume" mode operations to tens of microseconds.

With continuing reference to FIG. 2, despite improvements in transitional latency, the USB LPM still requires the LPM transaction packet 204(1) and the exit signal 206(1) for starting and ending the low-power operation period 202(1), respectively. Thus, the LPM transaction packet 204(1) and the exit signal 206(1) are overhead signals that can negatively impact data throughput between the USB host device 102 and the USB client device 104 due to additional packet transmissions. This impact is especially acute if data communications between the USB host device 102 and the USB client device 104 are periodic (e.g., voice, audio, etc.). It is thus desirable to optimize the USB LPM to further reduce communication overhead and transitional latency associated with the USB LPM. In contrast, if the respective entry times and exit times of the low-power operation periods 202(1), 202(2) can be predetermined, it is possible to schedule the low-power operation periods 202(1), 202(2) ahead of the time. By being scheduled, the low-power operation periods 202(1), 202(2) will automatically start and end. As a result, the LPM transaction packets 204(1), 204(2) and the exit signals 206(1), 206(2) will no longer be needed. As a result, the communication overhead and transitional latency associated with the USB LPM may be reduced.

Figure 3:
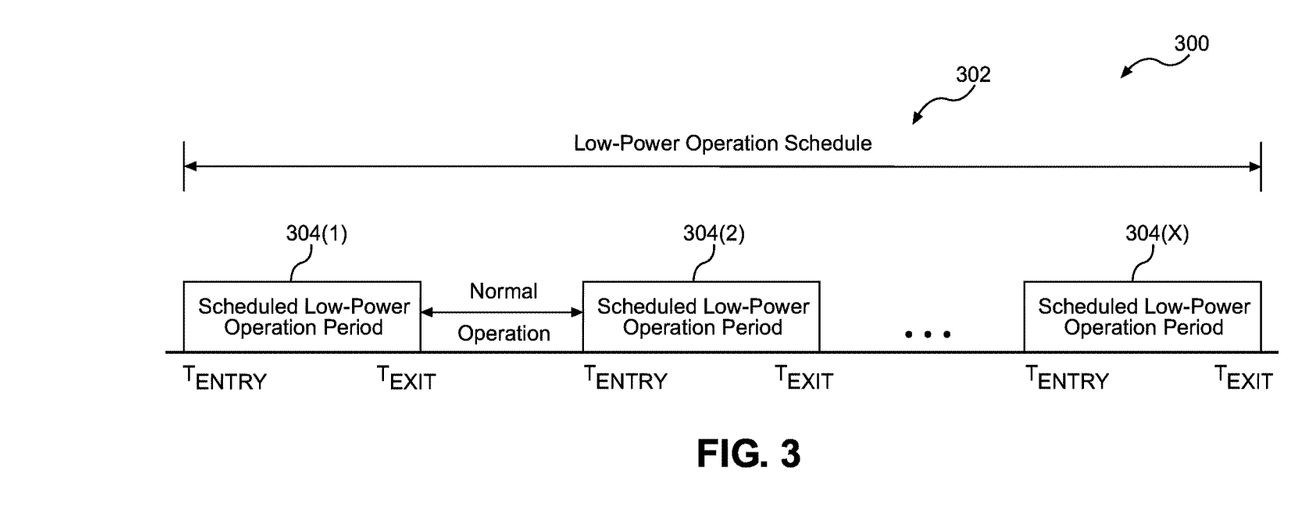
FIG. 3 is a schematic diagram of an exemplary scheduled USB low-power operation scheme for reducing communication overhead and transitional latency associated with the USB low-power operation scheme defined in the USB 2.0 LPM Addendum.

In this regard, FIG. 3 is a schematic diagram of an exemplary scheduled USB low-power operation scheme 300 for reducing communication overhead and transitional latency associated with the USB LPM. Elements of FIG. 1 are referenced in connection with FIG. 3 and will not be re-described herein. For the convenience of discussion, the USB 2.0 standard is referenced to hereinafter as a non-limiting example. Understandably, aspects of the scheduled USB low-power operation scheme 300 are applicable to earlier versions of the USB standards (e.g., USB 1.1) and later versions of the USB standards (e.g., USB 3.0, USB 3.1, and beyond), as well. Furthermore, the scheduled USB low-power operation scheme 300 may also be employed by non-USB hosts and clients such as peripheral component interconnect express (PCIe) and universal flash storage (UFS) hosts and clients.

With reference to FIG. 3, the USB host controller 106 in the USB host device 102 defines a low-power operation schedule 302 that comprises one or more scheduled low-power operation periods 304(1)-304(X). Each of the one or more scheduled low-power operation periods 304(1)-304(X) is associated with a respective entry time ($T_{ENTRY}$) and a respective exit time ($T_{EXIT}$). The USB host controller 106 communicates the low-power operation schedule 302 to the USB client controller 120 in the USB client device 104 using one or more existing USB standard packets (not shown). In a non-limiting example, the one or more existing USB standard packets may be one or more USB start-of-frame (SOF) packets, one or more USB Token packets, one or more USB zero-length-packets (ZLPs), one or more USB Handshake packets, or one or more USB data packets. Specific encodings in the one or more existing USB standard packets for communicating the low-power operation schedule 302 are further discussed later with regard to FIGS. 6A-6E. After communicating the low-power operation schedule 302 to the USB client controller 120, the USB host controller 106 can start a scheduled low-power operation period 304(Y), wherein 304(Y) refers to any scheduled low-power operation period among the one or more scheduled low-power operation periods 304(1)-304(X), according to the respective entry time ($T_{ENTRY}$) without providing a starting trigger signal (e.g., the LPM transaction packet 204(1) in FIG. 2) (not shown) to the USB client controller 120. Furthermore, the USB host controller 106 can end the scheduled low-power operation period 304(Y) according to the respective exit time ($T_{EXIT}$) without providing an ending trigger signal (e.g., the exit signal 206(1) in FIG. 2) (not shown). In a non-limiting example, the respective entry time ($T_{ENTRY}$) may also be set implicitly based on an offset time ($T_{OFFSET}$) (not shown) from a current time, whereby the USB client controller 120 may start the scheduled low-power operation period 304(Y) immediately and exit the scheduled low-power operation period 304(Y) when the offset time ($T_{OFFSET}$) expires. In this regard, the scheduled USB low-power operation scheme 300 can further reduce the communication overhead and transitional latency associated with the standard USB low-power operation scheme 200 in FIG. 2.

With continuing reference to FIG. 3, the USB client controller 120 in the USB client device 104 can also define the low-power operation schedule 302 that comprises the one or more scheduled low-power operation periods 304(1)-304(X). The USB client controller 120 communicates the low-power operation schedule 302 to the USB host controller 106 in the USB host device 102 using the one or more existing USB standard packets (not shown). In a non-limiting example, the one or more existing USB standard packets used by the USB client controller 120 may be USB Handshake packets, or USB data packets. After communicating the low-power operation schedule 302 to the USB host controller 106 and receiving a confirmation (e.g., the USB ACK packet) (not shown) from the USB host controller 106, the USB client controller 120 can start the scheduled low-power operation period 304(Y) according to the respective entry time ($T_{ENTRY}$) without providing the starting trigger signal (e.g., the LPM transaction packet 204(1) in FIG. 2) (not shown). Furthermore, the USB client controller 120 can end the scheduled low-power operation period 304(Y) according to the respective exit time ($T_{EXIT}$) without providing the ending trigger signal (e.g., the exit signal 206(1) in FIG. 2) (not shown). In a non-limiting example, the respective entry time ($T_{ENTRY}$) may also be set implicitly based on an offset time ($T_{OFFSET}$) (not shown) from a current time, whereby the USB client controller 120 may start the scheduled low-power operation period 304(Y) immediately and exit the scheduled low-power operation period 304(Y) when the offset time ($T_{OFFSET}$) expires. In this regard, the scheduled USB low-power operation scheme 300 can further reduce the communication overhead and transitional latency associated with the standard USB low-power operation scheme 200 in FIG. 2.

In a non-limiting example, each of the one or more scheduled low-power operation periods 304(1)-304(X) may be enabled by an existing USB low-power operation scheme (e.g., suspend mode) or a combination of the existing USB low-power operation schemes as defined in various versions of the USB standards (e.g., USB 1.1, USB 2.0, USB 3.0, and USB 3.1). Each of the one or more scheduled low-power operation periods 304(1)-304(X) must accommodate ramp-up delays associated with the existing USB low-power operation schemes. For example, if the scheduled low-power operation period 304(Y) is based on a USB suspend mode, the scheduled low-power operation period 304(Y) will be long enough to ensure the USB client device 104 can ramp up its phase-locked loop (PLL) before exiting the scheduled low-power operation period 304(Y). In some cases, the USB client controller 120 may need to perform certain USB handshakes prior to exiting the scheduled low-power operation period 304(Y). In this regard, the scheduled low-power operation period 304(Y) must accommodate delays associated with the handshake. In a non-limiting example, such handshakes may include exchanging USB 2.0 ACK/NACK/NYET and USB 3.0 ERDY/NRDY between the USB host controller 106 and the USB client controller 120.

Figure 4:
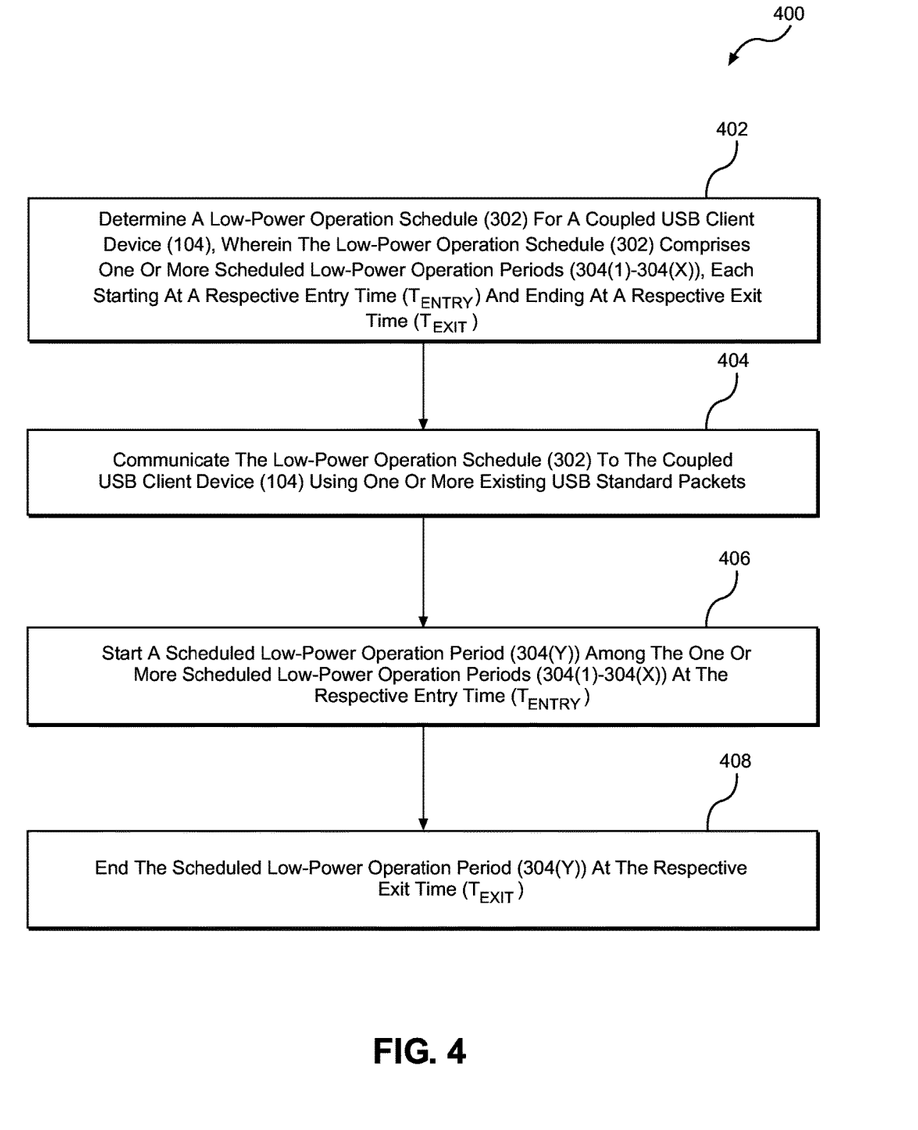
FIG. 4 is a flowchart illustrating an exemplary USB host controller process for supporting the scheduled USB low-power operation scheme in FIG. 3.
Figure 5:
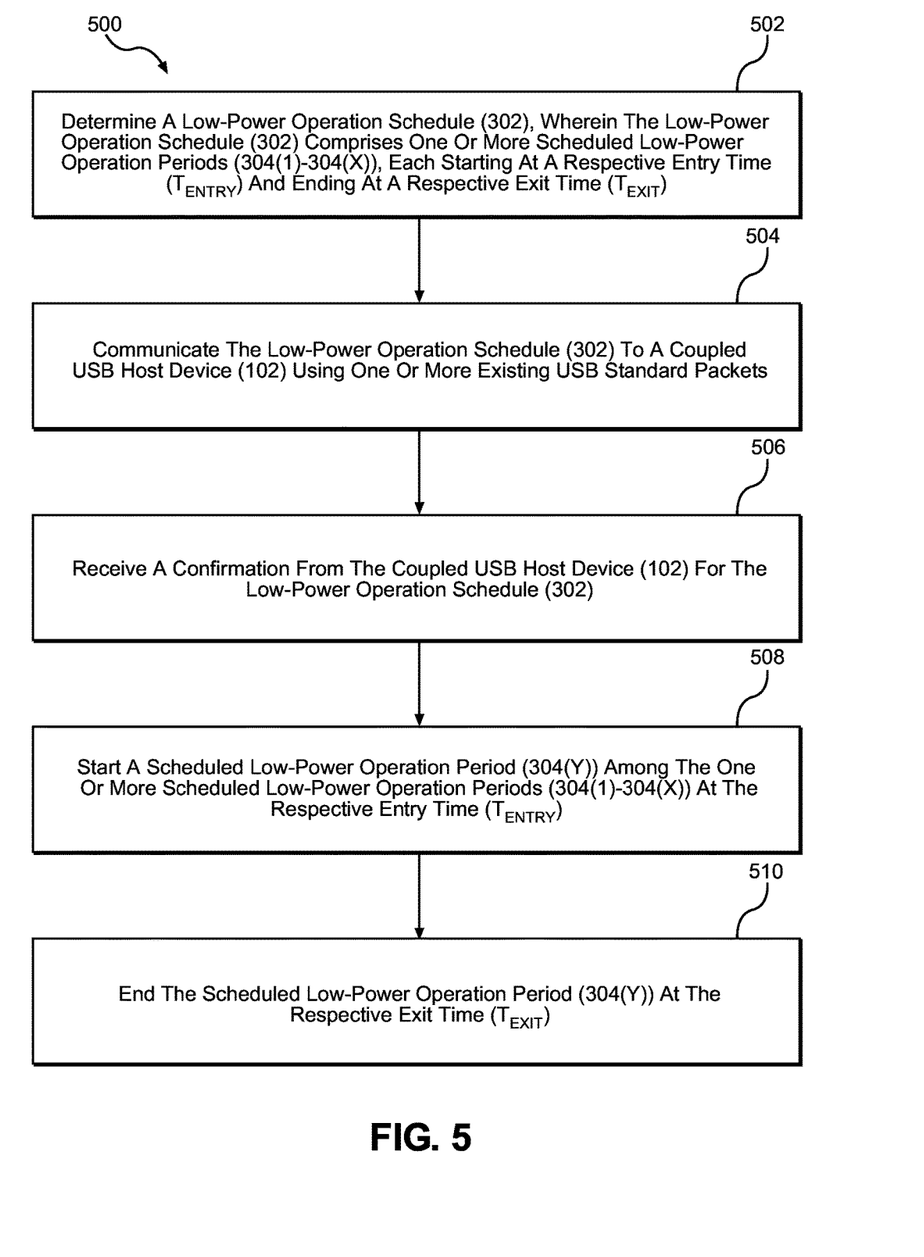
FIG. 5 is a flowchart illustrating an exemplary USB client controller process for supporting the scheduled USB low-power operation scheme in FIG. 3.

To illustrate the processes taken by the USB host controller 106 and the USB client controller 120 to support the scheduled USB low-power operation scheme 300, FIGS. 4 and 5 are provided, respectively. Elements of FIGS. 1 and 3 are referenced in connection with FIGS. 4 and 5, respectively, and will not be re-described herein.

In this regard, FIG. 4 is a flowchart illustrating an exemplary USB host controller process 400 for supporting the scheduled USB low-power operation scheme 300 in FIG. 3. The USB host controller 106 in the USB host device 102 determines the low-power operation schedule 302 for the coupled USB client device 104 (block 402). As discussed above, the low-power operation schedule 302 comprises the one or more scheduled low-power operation periods 304(1)-304(X), wherein each of the one or more scheduled low-power operation periods 304(1)-304(X) starts at the respective entry time ($T_{ENTRY}$) and ends at the respective exit time ($T_{EXIT}$). The USB host controller 106 then communicates the low-power operation schedule 302 to the coupled USB client device 104 using the one or more existing USB standard packets (block 404). As discussed above, the one or more existing USB standard packets may be USB SOF packets, USB Token packets, USB ZLPs, USB Handshake packets, or USB data packets. In a non-limiting example, after communicating the low-power operation schedule 302 to the USB client device 104, the USB host controller 106 can execute the low-power operation schedule 302 regardless of whether the low-power operation schedule 302 is correctly received and/or decoded by the USB client device 104. In this regard, the USB host controller 106 starts the scheduled low-power operation period 304(Y) among the one or more scheduled low-power operation periods 304(1)-304(X) according to the respective entry time ($T_{ENTRY}$) (block 406). Furthermore, the USB host controller 106 ends the scheduled low-power operation period 304(Y) according to the respective exit time ($T_{EXIT}$) (block 408).

FIG. 5 is a flowchart illustrating an exemplary USB client controller process 500 for supporting the scheduled USB low-power operation scheme 300 in FIG. 3. The USB client controller 120 in the USB client device 104 determines the low-power operation schedule 302 (block 502). As discussed above, the low-power operation schedule 302 comprises the one or more scheduled low-power operation periods 304(1)-304(X), wherein each of the one or more scheduled low-power operation periods 304(1)-304(X) starts at the respective entry time ($T_{ENTRY}$) and ends at the respective exit time ($T_{EXIT}$). The USB client controller 120 then communicates the low-power operation schedule 302 to the coupled USB host device 102 using the one or more existing USB standard packets (block 504). As discussed above, the one or more existing USB standard packets may be USB Handshake packets or USB data packets. Unlike the USB host controller 106, the USB client controller 120 must receive the confirmation (e.g., the USB ACK packet) from the coupled USB host device 102 for the low-power operation schedule 302 (block 506). In other words, the USB client controller 120 cannot execute the low-power operation schedule 302 without explicit confirmation from the coupled USB host device 102. In a non-limiting example, the USB host controller 106 may propose a different entry time ($T_{ENTRY}$) and/or exit time ($T_{EXIT}$) for the low-power operation schedule 302. After receiving the confirmation from the coupled USB host device 102, the USB client controller 120 starts the scheduled low-power operation period 304(Y) among the one or more scheduled low-power operation periods 304(1)-304(X) according to the respective entry time ($T_{ENTRY}$) (block 508). Furthermore, the USB client controller 120 ends the scheduled low-power operation period 304(Y) according to the respective exit time ($T_{EXIT}$) (block 510).

As previously discussed in FIG. 3, the one or more existing USB standard packets used for communicating the low-power operation schedule 302 between the USB host controller 106 and the USB client controller 120 may be the USB SOF packets, the USB Token packets, the USB ZLPs, the USB Handshake packets, or the USB data packets. In this regard, FIGS. 6A-6E are provided to illustrate exemplary encodings in the USB SOF packets, the USB Token packets, the USB ZLPs, the USB Handshake packets, and the USB data packets for communicating the low-power operation schedule 302. Elements of FIGS. 1 and 3 are referenced in connection with FIGS. 6A-6E and will not be re-described herein.

Figure 6A:
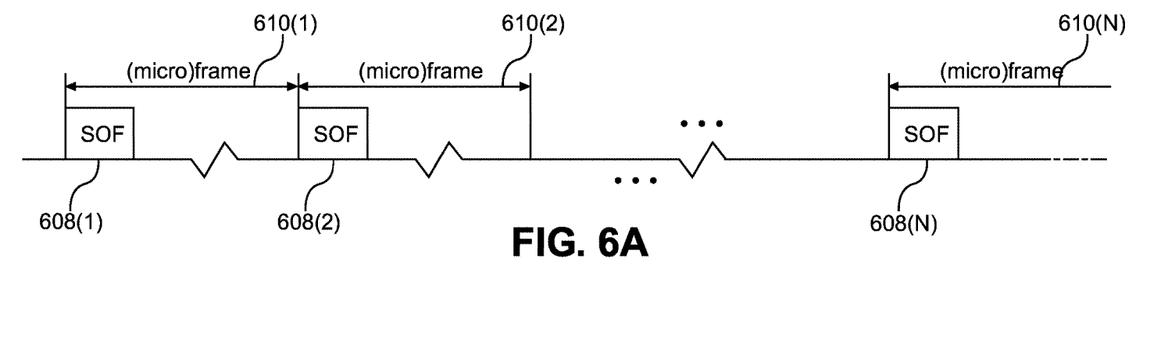
FIG. 6A is a schematic diagram of an exemplary format of a USB start-of-frame (SOF) packet that may be encoded for communicating a low-power operation schedule from the USB host device in FIG. 1 to the USB client device in FIG. 1.

FIG. 6A is a schematic diagram of an exemplary format of a USB SOF packet 600 that may be encoded for communicating the low-power operation schedule 302 from the USB host device 102 (not shown) to the USB client device 104 (not shown). The USB SOF packet 600 comprises a packet identification (PID) field 602, a FrameNumber field 604, and a cyclic redundancy check (CRC) field 606. In a non-limiting example, the FrameNumber field 604, which is eleven (11) octets in length, is encoded with the low-power operation schedule 302.

With continuing reference to FIG. 6A, according to the USB standard, the USB host device 102 transmits a plurality of USB SOF packets 608(1)-608(N) at the beginning of a plurality of USB frames or USB micro-frames 610(1)-610(N), respectively. A USB frame is one-millisecond (1 ms) in duration and used for low-speed data link in the USB 2.0 standard. A USB micro-frame is one hundred twenty-five microseconds (125 μs) in duration and used for high-speed data link in the USB 3.0 standard. As such, the one or more scheduled low-power operation periods 304(1)-304(X) in the low-power operation schedule 302 may be anchored to one or more USB SOF packets among the plurality of USB SOF packets 608(1)-608(N). For example, the respective entry time ($T_{ENTRY}$) of a scheduled low-power operation period among the one or more scheduled low-power operation periods 304(1)-304(X) may be anchored at a particular USB SOF packet among the plurality of USB SOF packets 608(1)-608(N). Given that the plurality of USB SOF packets 608(1)-608(N) are transmitted only from the USB host device 102 to the USB client device 104, only the USB host controller 106 can communicate the low-power operation schedule 302 using the plurality of USB SOF packets 608(1)-608(N).

Figure 6B:
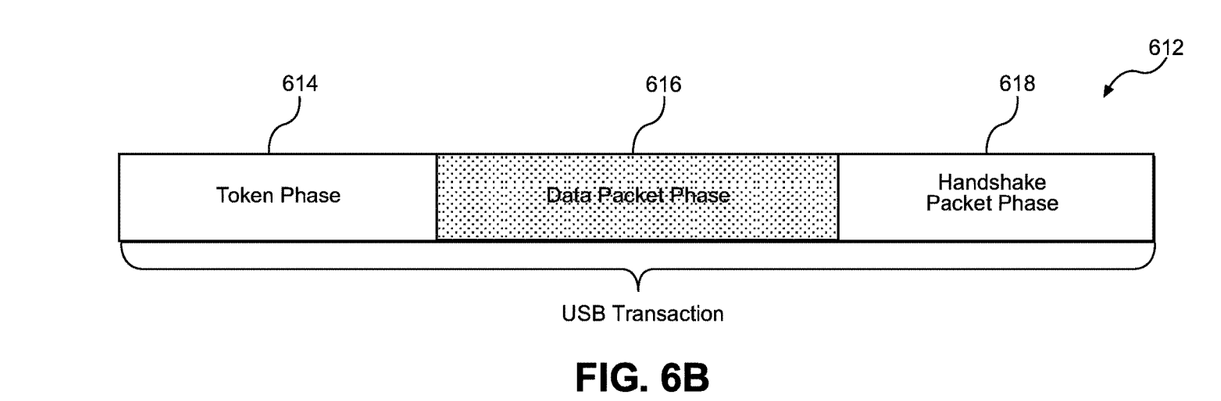
FIG. 6B is a schematic diagram illustrating an exemplary USB standard transaction.

FIG. 6B is a schematic diagram illustrating an exemplary USB standard transaction 612. According to FIG. 6B, the USB standard transaction 612 comprises a token phase 614, a data packet phase 616, and a handshake packet phase 618. In this regard, the USB Token packet (not shown), the USB data packet (not shown), and the USB Handshake packet (not shown) are communicated between the USB host device 102 and the USB client device 104 during the token phase 614, the data packet phase 616, and the handshake packet phase 618, respectively.

Figure 6C:
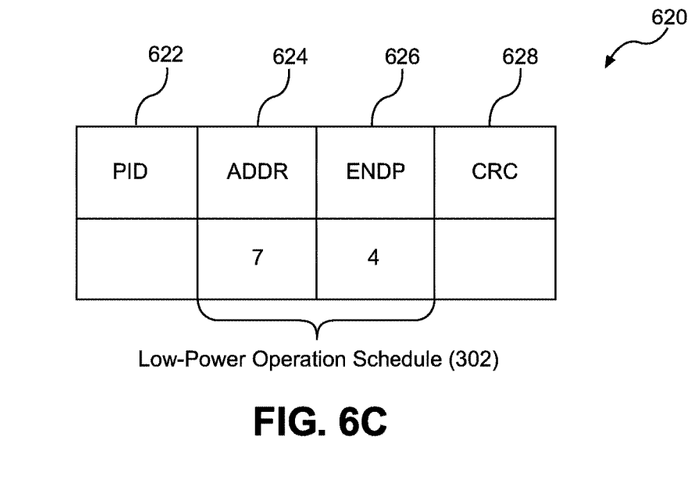
FIG. 6C is a schematic diagram of an exemplary format of a USB Token packet that may be encoded for communicating a low-power operation schedule from the USB host device in FIG. 1 to the USB client device in FIG. 1.

FIG. 6C is a schematic diagram of an exemplary format of a USB Token packet 620 that may be encoded for communicating the low-power operation schedule 302 from the USB host device 102 to the USB client device 104. The USB Token packet 620 comprises a packet 2D (PID) field 622, an address (ADDR) field 624, an endpoint (ENDP) field 626, and a CRC field 628. The ADDR field 624 and the ENDP field 626 are seven (7) octets and four (4) octets in length, respectively. In a non-limiting example, the ADDR field 624 and the ENDP field 626 are encoded with the low-power operation schedule 302. In another non-limiting example, it is possible to indicate a relevant endpoint (e.g., the USB client device 104) in the ENDP field 626 to facilitate packet prioritization at the relevant endpoint.

Given that the USB Token packet 620 is transmitted only from the USB host device 102 to the USB client device 104, only the USB host controller 106 can communicate the low-power operation schedule 302 using the USB Token packet 620.

Figure 6D:
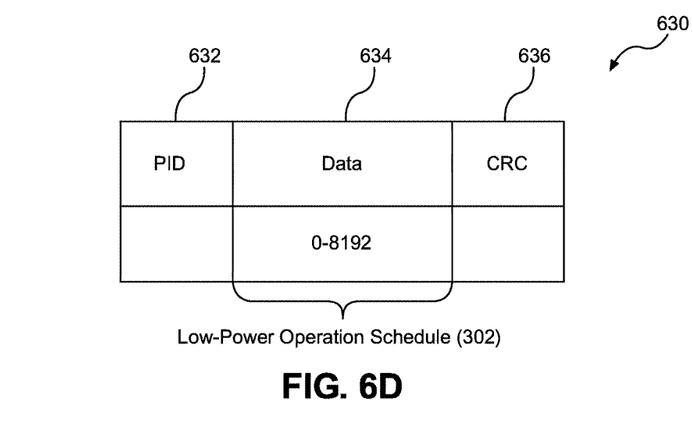
FIG. 6D is a schematic diagram of an exemplary format of a USB data packet that may be encoded for communicating a low-power operation schedule from the USB host device in FIG. 1 to the USB client device in FIG. 1.

FIG. 6D is a schematic diagram of an exemplary format of a USB data packet 630 that may be encoded for communicating the low-power operation schedule 302 from the USB host device 102 to the USB client device 104. The USB data packet 630 comprises a PID field 632, a data field 634, and a CRC field 636. The data field 634 has a variable length of up to eight thousand, one hundred ninety-two (8,192) octets. In this regard, it is possible to use a predetermined data structure, such as a type-length-value (TLV) data structure, to communicate the low-power operation schedule 302 between the USB host device 102 and the USB client device 104. In a non-limiting example, it is possible to use the predetermined data structure to indicate that the low-power operation schedule 302 is to commence after exchanging a predetermined number of USB data packets between the USB host device 102 and the USB client device 104. Given that the USB data packet 630 can be transmitted from both the USB host device 102 and the USB client device 104, both the USB host controller 106 and the USB client controller 120 can communicate the low-power operation schedule 302 using the USB data packet 630.

Figure 6E:
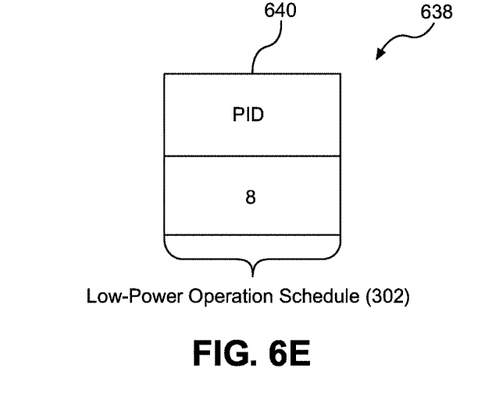
FIG. 6E is a schematic diagram of an exemplary format of a USB Handshake packet that may be encoded for communicating a low-power operation schedule from the USB host device in FIG. 1 to the USB client device in FIG. 1.

FIG. 6E is a schematic diagram of an exemplary format of a USB Handshake packet 638 that may be encoded for communicating the low-power operation schedule 302 between the USB host device 102 and the USB client device 104. The USB Handshake packet 638 comprises a PID field 640. In a non-limiting example, the PID field 640, which is eight octets in length, is encoded with the low-power operation schedule 302. Given that the USB Handshake packet 638 can be transmitted from both the USB host device 102 and the USB client device 104, both the USB host controller 106 and the USB client controller 120 can communicate the low-power operation schedule 302 using the USB Handshake packet 638.

Besides communicating the low-power operation schedule 302 between the USB host controller 106 and the USB client controller 120 using the USB SOF packets 608(1)-608(N), the USB Token packets 620, the USB ZLPs, the USB Handshake packets 638, or the USB data packets as discussed above, it is also possible to communicate the low-power operation schedule 302 between the USB host controller 106 and the USB client controller 120 using one or more USB proprietary packets.

Scheduled USB low-power operations according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a music headset, a speaker, a digital video player, a video player, a digital video disc (DVD) player, and a portable digital video player.

Figure 7:
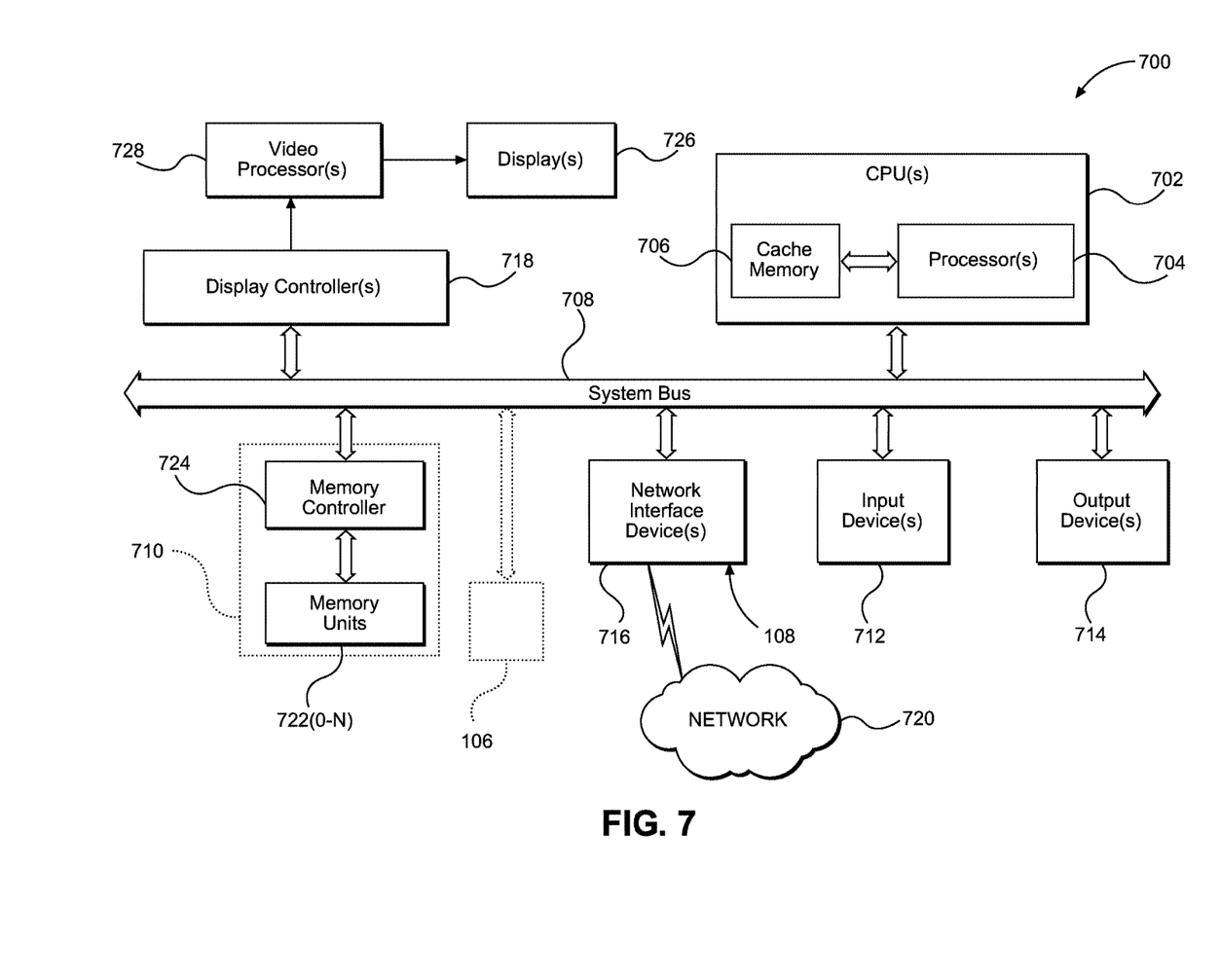
FIG. 7 illustrates an example of a processor-based system that can support the scheduled USB low-power operation scheme in FIG. 3.

In this regard, FIG. 7 illustrates an example of a processor-based system 700 that can support the scheduled USB low-power operation scheme 300 illustrated in FIG. 3. In this example, the processor-based system 700 includes one or more central processing units (CPUs) 702, each including one or more processors 704. The CPU(s) 702 may have cache memory 706 coupled to the processor(s) 704 for rapid access to temporarily stored data. The CPU(s) 702 is coupled to a system bus 708, to which the USB host controller 106 may be connected. As is well known, the CPU(s) 702 communicates with these other devices by exchanging address, control, and data information over the system bus 708. Although not illustrated in FIG. 7, multiple system buses 708 could be provided, wherein each system bus 708 constitutes a different fabric.

Other master and slave devices can be connected to the system bus 708. As illustrated in FIG. 7, these devices can include a memory system 710, one or more input devices 712, one or more output devices 714, one or more network interface devices 716, and one or more display controllers 718, as examples. The input device(s) 712 can include any type of input device, including but not limited to input keys, switches, voice processors, etc. The output device(s) 714 can include any type of output device, including but not limited to audio, video, other visual indicators, etc. The network interface device(s) 716 can be any device, including the host USB physical interface 108, configured to allow exchange of data to and from a network 720. The network 720 can be any type of network, including but not limited to a wired or wireless network, a private or public network, a local area network (LAN), a wireless local area network (WLAN), a wide area network (WAN), a BLUETOOTH™ network, or the Internet. The network interface device(s) 716 can be configured to support any type of communications protocol desired. The memory system 710 can include one or more memory units 722(0-N) and a memory controller 724.

The CPU(s) 702 may also be configured to access the display controller(s) 718 over the system bus 708 to control information sent to one or more displays 726. The display controller(s) 718 sends information to the display(s) 726 to be displayed via one or more video processors 728, which process the information to be displayed into a format suitable for the display(s) 726. The display(s) 726 can include any type of display, including but not limited to a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master devices and slave devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A universal serial bus (USB) host device for supporting scheduled low-power operations, comprising:
   a host USB physical interface configured to be coupled to a USB client device via a USB compliant cable, wherein the host USB physical interface is configured based on a wire-based USB standard; and
   a USB host controller configured to:
      determine a low-power operation schedule for the coupled USB client device, wherein the low-power operation schedule comprises at least two scheduled future low-power operation periods, each starting at a respective entry time and ending at a respective exit time;

communicate the low-power operation schedule to the coupled USB client device over the USB compliant cable using one or more existing USB standard packets provided by the wire-based USB standard;

start each of the at least two scheduled future low-power operation periods according to the respective entry time without providing a starting trigger signal to the coupled USB client device; and end each of the at least two scheduled future low-power operation periods according to the respective exit time without providing an ending trigger signal to the coupled USB client device.

2. The USB host device of claim 1, wherein the USB host device is configured to communicate the low-power operation schedule to the coupled USB client device using one or more USB start-of-frame (SOF) packets.

3. The USB host device of claim 2, wherein:
the low-power operation schedule is encoded in a respective FrameNumber field of the one or more USB SOF packets; and
the at least two scheduled future low-power operation periods comprised in the low-power operation schedule are anchored to one or more of a plurality of USB SOF packets transmitted by the USB host device.

4. The USB host device of claim 1, wherein the USB host device is configured to communicate the low-power operation schedule to the coupled USB client device using one or more USB Token packets.

5. The USB host device of claim 1, wherein the USB host device is configured to communicate the low-power operation schedule to the coupled USB client device using one or more USB zero-length-packets (ZLPs).

6. The USB host device of claim 1, wherein the USB host device is configured to communicate the low-power operation schedule to the coupled USB client device using one or more USB Handshake packets.

7. The USB host device of claim 1, wherein the USB host device is configured to communicate the low-power operation schedule to the coupled USB client device using one or more USB data packets.

8. The USB host device of claim 7, wherein:
the low-power operation schedule is encoded in a respective data field of the one or more USB data packets; and
the low-power operation schedule is configured to commence after exchanging a predetermined number of USB data packets between the USB host device and the coupled USB client device.

9. A method for supporting scheduled universal serial bus (USB) low-power operations at a USB host device, comprising:
determining a low-power operation schedule for a coupled USB client device, wherein the low-power operation schedule comprises at least two scheduled future low-power operation periods, each starting at a respective entry time and ending at a respective exit time;
communicating the low-power operation schedule to the coupled USB client device over a USB compliant cable using one or more existing USB standard packets provided by a wire-based USB standard;
starting each of the at least two scheduled future low-power operation periods according to the respective entry time without providing a starting trigger signal to the coupled USB client device; and
ending each of the at least two scheduled future low-power operation periods according to the respective exit time without providing an ending trigger signal to the coupled USB client device.

10. The method of claim 9, further comprising communicating the low-power operation schedule to the coupled USB client device using one or more USB start-of-frame (SOF) packets, wherein the low-power operation schedule is encoded in a respective FrameNumber field of the one or more USB SOF packets.

11. The method of claim 9, further comprising communicating the low-power operation schedule to the coupled USB client device using one or more USB Token packets.

12. The method of claim 9, further comprising communicating the low-power operation schedule to the coupled USB client device using one or more USB zero-length-packets (ZLPs).

13. The method of claim 9, further comprising communicating the low-power operation schedule to the coupled USB client device using one or more USB Handshake packets.

14. The method of claim 9, further comprising communicating the low-power operation schedule to the coupled USB client device using one or more USB data packets, wherein the low-power operation schedule is encoded in a respective data field of the one or more USB data packets.

15. A universal serial bus (USB) client device for supporting scheduled low-power operations, comprising:
a client USB physical interface configured to be coupled to a USB host device over a USB compliant cable, wherein the client USB physical interface is configured based on a wire-based USB standard; and
a USB client controller configured to:
determine a low-power operation schedule, wherein the low-power operation schedule comprises at least two scheduled future low-power operation periods, each starting at a respective entry time and ending at a respective exit time;
communicate the low-power operation schedule to the coupled USB host device over the USB compliant cable using one or more existing USB standard packets provided by the wire-based USB standard;
receive a confirmation from the coupled USB host device for the low-power operation schedule;
start each of the at least two scheduled future low-power operation periods according to the respective entry time without transmitting a trigger signal to the coupled USB host device; and
end each of the at least two scheduled future low-power operation periods according to the respective exit time without transmitting the trigger signal to the coupled USB host device.

16. The USB client device of claim 15, wherein the USB client device is configured to communicate the low-power operation schedule to the coupled USB host device using one or more USB Handshake packets.

17. The USB client device of claim 15, wherein the USB client device is configured to communicate the low-power operation schedule to the coupled USB host device using one or more USB data packets.

18. The USB client device of claim 17, wherein:
the low-power operation schedule is encoded in a respective data field of the one or more USB data packets; and
the low-power operation schedule is configured to commence after exchanging a predetermined number of USB data packets between the USB client device and the coupled USB host device.

19. A method for supporting scheduled universal serial bus (USB) low-power operations at a USB client device, comprising:

determining a low-power operation schedule, wherein the low-power operation schedule comprises at least two scheduled future low-power operation periods, each starting at a respective entry time and ending at a respective exit time;

communicating the low-power operation schedule to a coupled USB host device over a USB compliant cable using one or more existing USB standard packets provided by a wire-based USB standard;

receiving a confirmation from the coupled USB host device for the low-power operation schedule;

starting each of the at least two scheduled future low-power operation periods according to the respective entry time without transmitting a trigger signal to the coupled USB host device; and ending each of the at least two scheduled future low-power operation periods according to the respective exit time without transmitting the trigger signal to the coupled USB host device.

20. The method of claim 19, further comprising:

communicating the low-power operation schedule to the coupled USB host device using one or more USB Handshake packets;

receiving an Acknowledgement (ACK) packet from the coupled USB host device for the one or more USB Handshake packets; and implementing the low-power operation schedule if the ACK packet is received from the coupled USB host device.

21. The method of claim 19, further comprising:

communicating the low-power operation schedule to the coupled USB host device using one or more USB data packets, wherein the low-power operation schedule is encoded in a respective data field of the one or more USB data packets;

receiving an Acknowledgement (ACK) packet from the coupled USB host device for the one or more USB data packets; and implementing the low-power operation schedule if the ACK packet is received from the coupled USB host device.

22. A universal serial bus (USB) host device for supporting scheduled low-power operations, comprising:

a host USB physical interface configured to be coupled to a USB client device, wherein the host USB physical interface is configured based on a USB standard selected from the group consisting of: USB release 2.0 (USB 2.0) standard; and USB release 3.0 (USB 3.0) standard; and a USB host controller configured to:

determine a low-power operation schedule for the coupled USB client device, wherein the low-power operation schedule comprises at least two scheduled future low-power operation periods, each starting at a respective entry time and ending at a respective exit time;

communicate the low-power operation schedule to the coupled USB client device using one or more existing USB standard packets selected from the group consisting of: USB start-of-frame (SOF) packets; USB Token packets; and USB zero-length-packets (ZLPs) provided by the USB standard;

start each of the at least two scheduled future low-power operation periods according to the respective entry time without providing a starting trigger signal to the coupled USB client device; and end each of the at least two scheduled future low-power operation periods according to the respective exit time without providing an ending trigger signal to the coupled USB client device.

* * * * *